No. 772,807. PATENTED OCT. 18, 1904.
W. R. KETCHUM.
FISH HOOK.
APPLICATION FILED FEB. 27, 1904.
NO MODEL.

Witnesses:
Roy C. Laflin
C. E. Schnell

Inventor:
W. R. Ketchum
by Edson Bro's
Attorneys

No. 772,807. Patented October 18, 1904.

UNITED STATES PATENT OFFICE.

WILLIAM R. KETCHUM, OF PORTAGE, WISCONSIN.

FISH-HOOK.

SPECIFICATION forming part of Letters Patent No. 772,807, dated October 18, 1904.

Application filed February 27, 1904. Serial No. 195,591. (No model.)

*To all whom it may concern:*

Be it known that I, WILLIAM R. KETCHUM, a citizen of the United States, residing at Portage, in the county of Columbia and State of Wisconsin, have invented certain new and useful Improvements in Fish-Hooks; and I do hereby declare the following to be a full, clear, and exact description of the invention, such as will enable others skilled in the art to which it appertains to make and use the same.

My invention relates to fish-hooks.

It has for its object to provide a gang-hook more particularly adapted for frog-bait casting which has its hooks so arranged that no matter where the fish bite the fisherman can strike at once. The hooks are mounted on a frame which supports the frog in a natural position, so that as the line is drawn in it has the appearance of swimming.

The device is simple of construction, cheap of manufacture, and one will outlast several ordinary devices and will catch twice or three times as many fish.

The invention consists of the construction and combinations of parts hereinafter described, and more particularly pointed out in the claims concluding this specification.

Figure 1:
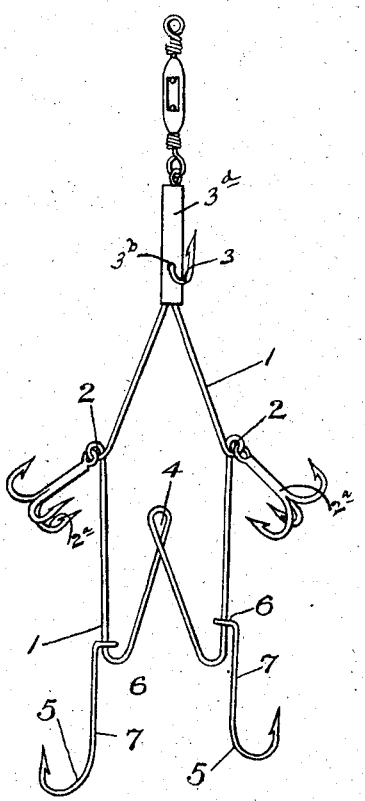
Figure 2:
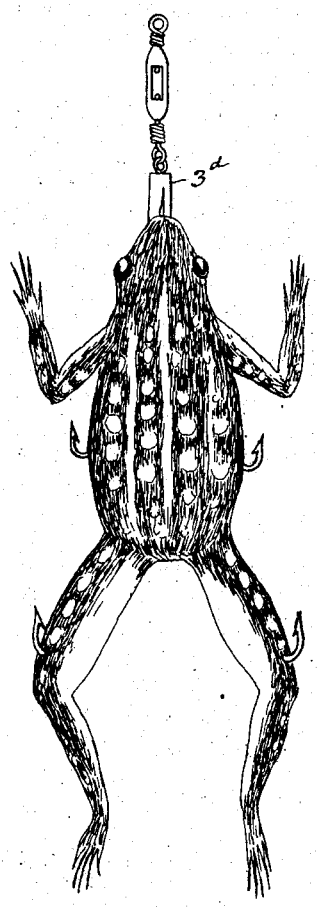

In the accompanying drawings, illustrating the preferred embodiment of my invention, Figure 1 is a perspective view of the device, showing how the several hooks are connected to the frame. Fig. 2 is a view showing a frog in place on the frame.

Referring more particularly to the drawings, in carrying out my invention I provide a frame 1, preferably of wire and having substantially parallel side wires. Said frame has two eyes or loops 2, one on each side and about midway of its length, to each of which is connected a triple-pronged hook $2^a$. Above these loops the side wires of the frame preferably converge and meet, and here a third hook, 3, is secured. The latter hook may be of the ordinary type strung on the extension of one of the side wires of the frame and held in place by a sleeve $3^a$. The hook extends through an opening $3^b$ in said sleeve. Below the loops the side wires run preferably parallel to each other a distance about equal to the converging arms above and are then bent inward and upward and looped, as at 4, in the center. Said looped portion 4 may be raised somewhat above the level of the side wires to support the body of the frog in a natural position. This, however, is not essential, nor that the wires be looped in the center, as at 4. These wires, if bent sharply or in a plain curve, will serve the purpose of my invention equally as well.

Mounted to slide up and down upon the side wires are hooks 5, each having its connecting-eye 6 bent substantially at right angles with the stem 7 thereof to facilitate such sliding motion.

To place the bait in place, the frog is laid in a natural position, back up, upon the frame, the forward hook being stuck through the lower jaw into the mouth, where it is out of sight. The side hooks are thrust into the sides of the body and the lower hooks are adjusted to engage the fleshy parts of the legs. Thus the bait is held securely in place and in such a position that when the line is reeled in the frog has the appearance of swimming and does not twirl around in the water, as is the case with most devices of this kind, and which tends to frighten the fish. At the same time no matter where the fish bites he is bound to be caught by one of the hooks, so that the fisherman can strike at once when he feels a bite and will catch his fish five out of six times.

The frame is so constructed that it can be attached to any small-sized spoon-hook, a "Skinner," size $4\frac{1}{2}$, for instance, by simply uncoupling the loop where the hooks are held to the spoon device and slipping the loop through the eye of the swivel attached to my gang.

It is obvious that the frame may be made in various sizes, and different sizes and styles of hooks may be used in connection therewith without departing from the spirit or sacrificing the spirit of my invention. I therefore reserve the right to make such changes in detail as fairly fall within the scope of my invention.

Having thus described my invention, what I claim as new, and desire to secure by Letters Patent, is—

1. In a device of the character described, a frame having a central and two lateral non-slidable hooks and two slidably-adjustable hooks.

2. In a device of the character described, a frame having a forward fixed hook, two swingingly-mounted lateral hooks and two slidably-adjustable hooks.

3. In a device of the character described, a frame having one end pointed and having secured thereto a hook, parallel side wires having loops carrying hooks and other hooks mounted to slide on said side wires.

4. In a device of the character described, a frame having one end pointed and carrying a hook, parallel side wires forming loops with the converging wires, said loops carrying hooks, other hooks mounted to slide on said side wires, said frame forming a reëntrant angle at the end opposite the point.

5. In a device of the character described, a frame having one end pointed and a hook secured thereto, parallel side wires having loops carrying hooks, and other hooks mounted to slide on said side wires and having their eyes bent at angles with their shanks.

In testimony whereof I affix my signature in presence of two witnesses.

WILLIAM R. KETCHUM.

Witnesses:
W. H. PARRY,
W. MARQUARDT.